United States Patent [19]
Speer

[11] 3,752,522
[45] Aug. 14, 1973

[54] AUTOMOTIVE VEHICLE IMPACT ENERGY REDUCING BUMPER

[76] Inventor: Eugene M. Speer, 401 Jennie Jewel Dr., Orlando, Fla. 32806

[22] Filed: Nov. 17, 1971

[21] Appl. No.: 199,420

[52] U.S. Cl. ................ 293/60, 293/30, 293/85, 293/63, 293/89
[51] Int. Cl. .............................. B60r 19/06
[58] Field of Search ............. 293/DIG. 5, 30, 60, 293/63, 64, 65, 66, 67, 73, 85, 86, 89

[56] References Cited
UNITED STATES PATENTS

| | | | |
|---|---|---|---|
| 2,650,126 | 8/1953 | Barnas | 293/64 |
| 3,226,146 | 12/1965 | Behr | 293/30 |
| 2,090,659 | 8/1937 | Zirmer et al. | 293/86 |
| 3,519,301 | 7/1970 | Somnitz | 293/1 |
| 2,966,225 | 12/1960 | Carroll | 180/83 |
| 3,134,619 | 5/1964 | Harrison, Jr. | 293/9 |

*Primary Examiner*—Gerald M. Forlenza
*Assistant Examiner*—Robert Saifer
*Attorney*—Charles W. Helzer

[57] ABSTRACT

The impact of a longitudinal collision with respect to a wheeled vehicle is at least partially dissipated by the impact object striking projections extending longitudinally beyond the conventional resiliently mounted bumpers so as to drive the impact members longitudinally inwardly for in turn driving energy absorbing means longitudinally generally in a horizontal plane. Particularly, the impact energy absorbing means include at least one coil spring carried within a tube extending from the one end of the vehicle to the opposite end, wherein some embodiments it extends at right angles or is reversely bent to again extend to a terminal end at the one end of the vehicle, so that the impact energy is dissipated in driving the coil spring from the one end to the opposite end, and transversely or in a return path to the one end according to the various embodiments. Fluid expansible chamber shock absorbers may be interposed within the energy absorbing means, the energy absorbing means may redirect the blow in the opposite longitudinal direction back against the impact object, transversely at the opposite end of the vehicle to swing the vehicle away from the impact object, or against an internal resiliently mounted bumper at the opposite end of the vehicle from the impact object.

14 Claims, 7 Drawing Figures

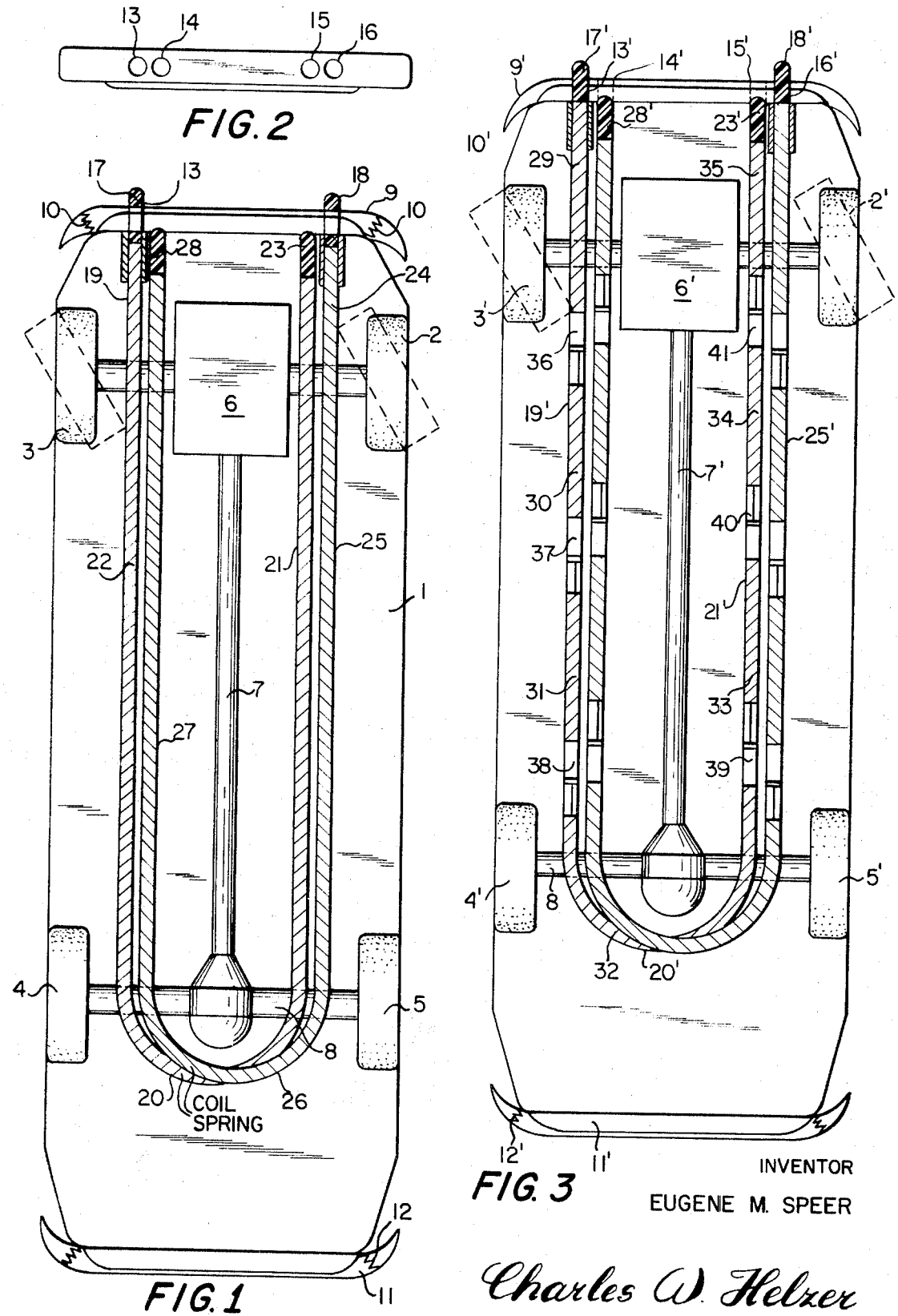

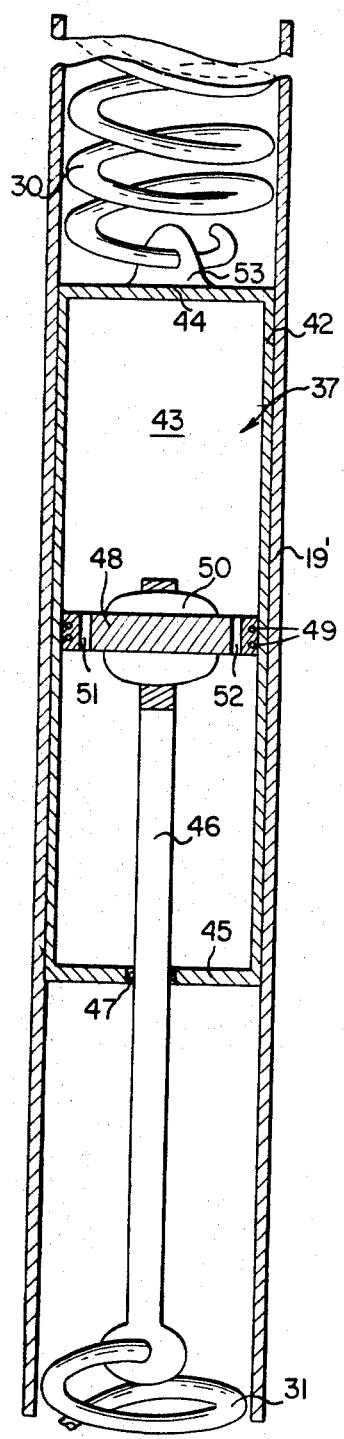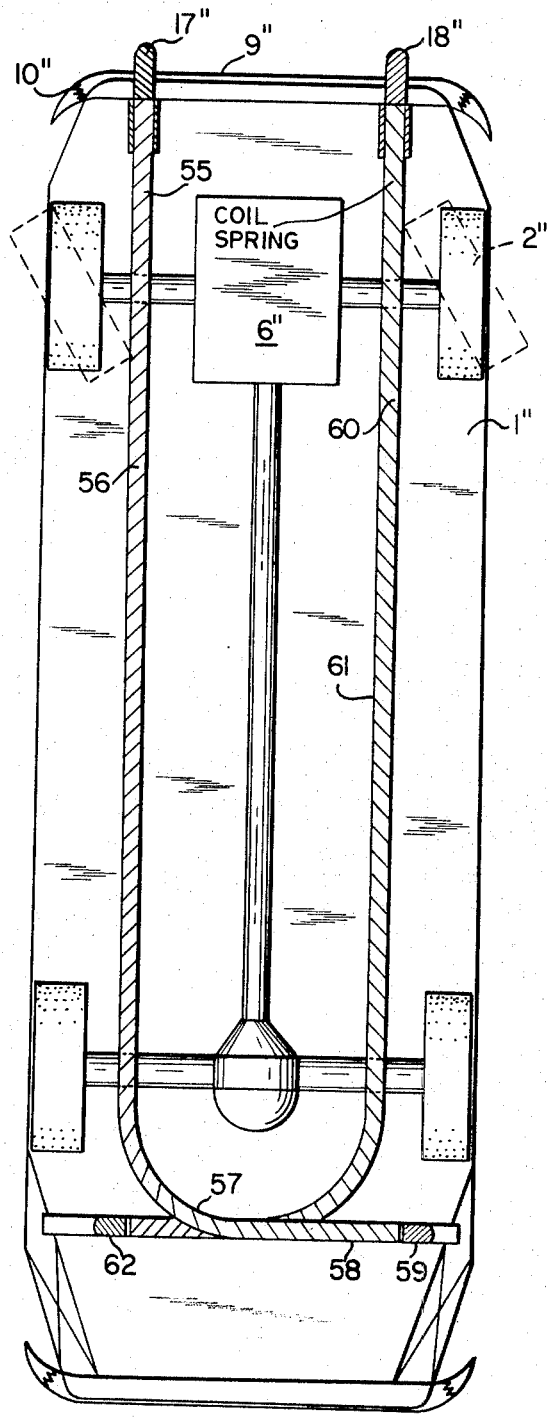
FIG. 4
FIG. 5
INVENTOR
EUGENE M. SPEER
Charles W. Helzer
ATTORNEY

INVENTOR
EUGENE M. SPEER

Charles W. Helzer
ATTORNEY

AUTOMOTIVE VEHICLE IMPACT ENERGY REDUCING BUMPER

BACKGROUND OF THE INVENTION

There has been an increased concern over the inability of wheeled vehicles, particularly automotive vehicles, to absorb collision impacts at speeds over 5 miles per hour without damage to the vehicle and more preferably at 10 miles per hour without damage to the vehicle. Further, it is desirable that these impacts be spread over a considerable period of time in comparison to the shock of a rigid vehicle hitting an impact object at such speeds to decrease the chance of injury to occupants. Further, it is desirable that these same means be of considerable use with respect to a high energy impact collision that would greatly damage a vehicle such as a collision at highway speeds, to lessen the chance of inury to the vehicle occupants.

In the past, there have been numerous ways of resiliently mounting vehicle bumpers, which provide only a partial solution. The difficulty of mounting only the vehicle bumper in a resilient manner generally relates to the inertia of such a bumper in that it would tend to permanently deform before being driven inwardly, so that it would not satisfy the requirements of 5 or 10 mile per hour longitudinal collisions without permanent damage.

Further, there have been devices in addition to the standard vehicle bumper for striking an impact object before the bumper and to be driven rearwardly into engagement with the ground or a vehicle wheel, but such devices do not in themselves absorb any material amount of impact energy and they only transfer such energy to the ground or a wheel. The transferring of the energy to the ground would merely increase the shock of an accident in that the ground is indeed a rigid object and rigidity is to be avoided, and the transferring of the impact to a vehicle wheel will further stress an element that is already being stressed under emergency conditions of braking or steering. Engaging a vehicle wheel would tend to destroy the wheel or at least destroy its steering function in the case of a front steerable wheel.

SUMMARY OF THE INVENTION

It is an object of the present invention to satisfy the various requirements of withstanding collision impacts at 5 or 10 miles per hour without permanent damage to the vehicle and with shocking the occupants in the least possible manner by spreading out the impact energy over a considerable period of time. The above is accomplished by providing impact members that extend beyond, preferably through, the conventional vehicle bumpers to first strike an impact object and be driven rearwardly with little inertia compared to the inertia of the relatively large vehicle bumpers. These impact members in turn drive progressively increasing resistance energy absorbing means in the form of one or more coil springs, that may be in combination with one or more fluid expansible chamber shock absorbers. Preferably, the impact members are contained within the outer ends of tubes that extend from the impact end of the vehicle to the opposite end of the vehicle, and in some cases transversely to one side or the other or reversely back to the impact end of the vehicle. One or more coil springs are contained within these tubes to be drivingly connected to the impact members. Further, fluid expansible chamber shock absorbers may be connected between adjacent ones of the plural springs or at the opposite end of the single springs from the impact members. In the embodiment wherein the tubes reversely extend back in the longitudinal direction to the impact end, both ends of the springs may be provided with impact members, one extending outwardly beyond the confines of the bumper to first engage the impact object and the other being inside of the confines of the vehicle bumper for being freely movable to a position outside to transfer the impact energy back to the impact object.

BRIEF DESCRIPTION OF THE DRAWING

Further objects, features and advantages of the present invention will become more clear from the following detailed description of the drawing, wherein:

FIG. 1 is a view of the underside of an automotive vehicle employing the features of the present invention;

FIG. 2 is a front end view of the vehicle bumper according to FIG. 1;

FIG. 3 is a view of an automotive vehicle similar to FIG. 1, but of a second embodiment;

FIG. 4 is a cross section of a portion of the energy absorbing means of the embodiment according to FIG. 3;

FIG. 5 is a view similar to FIG. 1, but of another embodiment of the present invention;

DETAILED DESCRIPTION OF THE DRAWING

Figure 6:
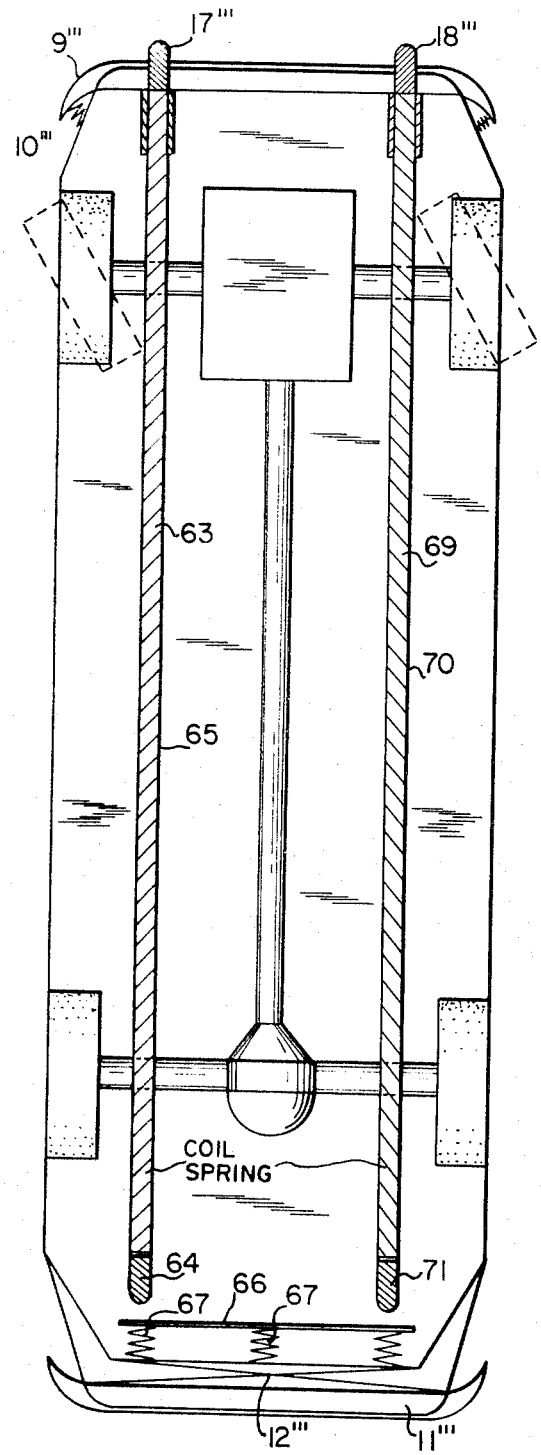
FIG. 6 is a view similar to FIG. 1, but of still another embodiment of the present invention.

With respect to the embodiment shown in FIG. 1, a motor vehicle constructed according to the present invention includes a conventional relatively rigid vehicle frame 1, two forward steerable wheels 2 and 3, two rearward driven wheels 4 and 5, an engine 6, a drive train 7, and a driving axle assembly 8 for driving the rear wheels 5. Further in a conventional manner, the vehicle may be provided with a forward bumper 9 having side portions wrapping around the side portions of the vehicle frame and generally forming the forward most portion of the conventional structure. The bumper 9 is preferably resiliently mounted to the vehicle frame 1 by means of coil springs 10, although it is contemplated that leaf springs, elastomeric mountings, or the like may be employed to mount the bumper to the vehicle frame in a manner to absorb minor shocks from striking impact objects. Further, the vehicle is provided with a rearward bumper 11 similar to the forward bumper 9 and being mounted to the frame 1 by means of similar resilient mountings 12. The remaining portions of the vehicle that are not shown may be conventional and form no part of the present invention and are not needed for an understanding of the present invention. It is thus seen that the vehicle is generally symmetrical with respect to a longitudinal axis passing through the drive train 7.

As shown particularly in FIG. 2, the forward bumper 9 is provided with four holes 13, 14, 15, 16 extending completely therethrough in the longitudinal direction and being arranged in pairs symmetrical with respect to the longitudinal axis. Generally cylindrical impact members 17 and 18 freely extend through respective holes 13 and 16 for longitudinal movement with respect to the bumper 9. Preferably, these impact members are constructed of a relatively stiff elastomeric or synthetic resin material. The impact members 17 and 18, as shown, extend outwardly a considerable distance beyond the bumper 9 so that with a longitudinal impact, one or both of the impact members 17, 18 will strike the impact object before the bumper 9.

Inwardly of the impact members 17, 18, impact energy absorbing means are employed to be driven by one or more of the impact members upon striking an impact object. As shown, a preferably cylindrical tube 19 of uniform diameter is longitudinally aligned with and receives therein in a telescopic sliding manner the impact member 17. The tube 19 extends rearwardly from the impact end of the vehicle in the longitudinal direction to the opposite end of the vehicle where it is reversely bent at 20 to extend forward at 21 to the impact end of the vehicle on the opposite side of the longitudinal axis and terminate closely adjacent the bumper 9. A coil spring 22 of considerable mass is slidably contained within substantially the entire length of the tube 19 and drivingly connected at one end to the impact member 17 so as to be driven longitudinally through the tube 19 when the impact member 17 strikes an impact object. In this manner, the coil spring will function as an energy absorbing means by absorbing the impact energy through friction while the coil moves through the tube and engages the tube walls, and to prevent freeze-up, canting or locking, a liquid or dry lubricant may be provided within the tube 19. Further, movement of the coil spring 22 through the tube 19 will distribute the impact forces over a considerable period of time and absorb some of these forces in passing around the bend portion 20 by creating centrifugal forces. Movement of the coil spring toward the impact object within the return portion 21 of the tube 19 will redirect the impact forces in the opposite direction so as to drive a secondary impact member 23, which is connected to the terminal end of the coil spring opposite from the impact member 17, in a forward direction, that is, back toward the impact object. To assist in this redirection of the impact force, the bumper, as mentioned above, is provided with a hole 15, which is longitudinally aligned with the secondary impact member 23 and will allow free passage of the secondary impact member 23 therethrough so that upon being driven by the coil spring 22, the secondary impact member 23 will move through the hole 15 and strike the impact object to return the impact force in the opposite direction to the impact object.

In a similar manner, but as a mirror image with respect to the longitudinal axis, the impact member 18 is drivingly connected to a coil spring 24 carried within a tube 25 that extends rearwardly, that is toward the opposite end of the vehicle from the impact end, to a reverse bend portion 26, and finally forward along a return portion 27 to the impact end of the vehicle. At this opposite end of the tube 25, there is provided a secondary impact member 28 that functions in the manner of the secondary impact 23 and is accordingly drivingly connected to the end of the coil spring 24 opposite from the impact member 18. Thus, the energy absorbing system 17, 19–23 functions in an identical manner with the impact absorbing system 18, 24–28, but with corresponding elements being mirror images of each other.

With respect to the embodiment of the present invention according to FIG. 3, elements that are identical with corresponding elements of FIG. 1 have been given the same numerals and the above description applies with respect thereto. Accordingly, only those elements of FIG. 3 that are different from those of FIG. 1 will be described in detail either with respect to their differing function or structure, and with respect to identical elements, primes have been added to those numbers of FIG. 3 to denote a second embodiment.

Instead of a single coil spring extending entirely through the tube 19 as in FIG. 1, the embodiment of FIG. 3 contains a plurality of coil springs 29–35 serially arranged in spaced relationship. In addition, fluid expansible chamber shock absorbers 36–41 are respectively arranged between adjacent ends of the coil springs 29–35 so as to alternate between coil springs and shock absorbers from one end of the tube 19' to the opposite end of the tube. In a serial manner, the impact member 17' is drivingly connected to the coil spring 29, the coil spring 29 is drivingly connected to the adjacent end of the shock absorber 36, the shock absorber 36 is drivingly connected to the coil spring 30, the coil spring 30 is drivingly connected to the shock absorber 37, the shock absorber 37 is drivingly connected to the coil spring 31, and the like around to the coil spring 35 that is drivingly connected to the secondary impact member 23', which is aligned with the hole 15' in the bumper 9'. The energy absorbing means 17', 29–41, 23' is freely slidable, except for friction, within the tube 19' and bumper 9' to transfer impact energy in substantially the same manner as the means 17, 22, 23 of FIG. 1, but in addition the energy is further absorbed by fluid friction within the shock absorbers 36–41 and dissipated as heat. The shock absorbers may be of any known conventional construction, and be either pneumatic or hydraulic. The impact energy means that are associated with impact member 18', tube 25' and secondary impact member 28' are mirror images of those just described with respect to the elements 17', 29–41, 23', and therefore will not be described in further detail.

By way of example and according to a preferred form, FIG. 4 shows in detail the connection between the alternating springs and shock absorbers of FIG. 3, and since these connections are all identical, only one will be shown. The shock absorber 37 is drivingly connected between the coil springs 30 and 31, and slidably received within the tube 19'. The shock absorber 37 includes a member 42 having a tubular intermediate wall 43, an end wall 44, and an apertured end wall 45 to form therein a main chamber sealed by passage of a piston rod 46 through the aperture within the end wall 45 with the interposition of an O-ring seal 47. This chamber is subdivided into two chambers by and on opposite sides of a piston 48 drivingly connected to the piston rod 46 and slidably mounted within the tubular portion 43, but sealed with respect thereto by O-rings 49. In the conventional manner of a shock absorber, the driving connection between the piston rod 46 and the piston 48 is formed by an elastomeric mount 50, and the piston 48 is provided with bleed passages 51, 52 so that as it reciprocates within the main chamber, fluid will be transferred from one side of the piston to the other opposite side of the piston and energy will be dissipated as fluid friction heat. The chamber portion of the shock absorber is drivingly connected to the spring 30 by passage of the adjacent end of the spring 30 lockingly through an apertured member 53 integral with the end wall 44.

In the embodiment of FIG. 5, only those elements that are different in function or structure from elements of the embodiment according to FIG. 1 will be described in detail, and elements identical in function and structure will bear numerals identical to corresponding elements in FIG. 1, with the exception of double primes to indicate the new embodiment. The impact member 17" is drivingly connected to the forward end of a coil spring 55 that is slidably carried within a tube 56 that extends from the forward end of the vehicle rearwardly to a bent portion 57 where it is redirected transversely to the opposite side of the vehicle at 58. The coil spring 55 has at its opposite end a terminal member 59, which may be a weight to be thrown transversely through an aperture in the vehicle along with the following portions of the coil spring 55, or may be a closure member integral with the tube 56 that is rigidly mounted on the frame 1". In a like manner, the impact member 18" is drivingly connected to a coil spring 60 carried within a tube 61 having terminal member 62 at its other end. It is thus seen, that the elements 17", 55, 56, 59 are mirror images of corresponding elements 18", 60, 61, 62 and all carried within a common horizontal plane. In a collision, the impact member 17" will strike an impact object long before the object strikes the bumper 9" to drive the coil spring 55 rearwardly within the tube 56, around the bent portion 57 to develop centrifugal forces as in the embodiment of FIG. 1, and transversely along the side tube portion 58 to either strike and rebound from the rigidly mounted terminal end member 59 or drive the member 59 transversely. In this manner, impact forces are dissipated by friction and centrifugal force, and further redirected at the opposite end of the vehicle at right angles to the collision path to swing the vehicle away from the impact object. Further, with rotation of the vehicle, further impact energy will be absorbed by the tires skidding transversely.

In the embodiment of FIG. 6, only those items that are different from the previous embodiments will be described in detail and for a description of the remaining items reference is made to the preceding embodiments, with the numbering system being as before. In the embodiment of FIG. 6, the impact member 17''' is drivingly connected to the forward end of a coil spring 63, which at its other end is drivingly connected to secondary impact member 64. The impact members 17''', 64 and coil spring 63 are drivingly carried within the tube 65 that is rigidly mounted on the vehicle frame. In this manner, the impact object will first strike the impact member 17''' and drive it together with the coil spring 63 rearwardly within the tube 65 to drive the secondary impact member 64 longitudinally into engagement with an inner bumper 66, which inner bumper 66 is resiliently mounted by means 67 to the vehicle frame 1 in a manner reversely with respect to the rear bumper 11''' that is resiliently mounted at 12''' to the frame. Minor deformation of the inner bumper 66 will not show. In this manner, impact energy is dissipated by driving and rebounding the coil spring 63 within the tube 65 as has been done previously, and further by the spring mountings for the inner bumper 66. In a like manner, the impact member 18''' is drivingly connected to a coil spring 69 carried within a tube 70 and connected at its opposite end to the secondary impact member 71 that will upon impact engage the opposite side of the inner bumper 66 for a similar function.

Figure 7:
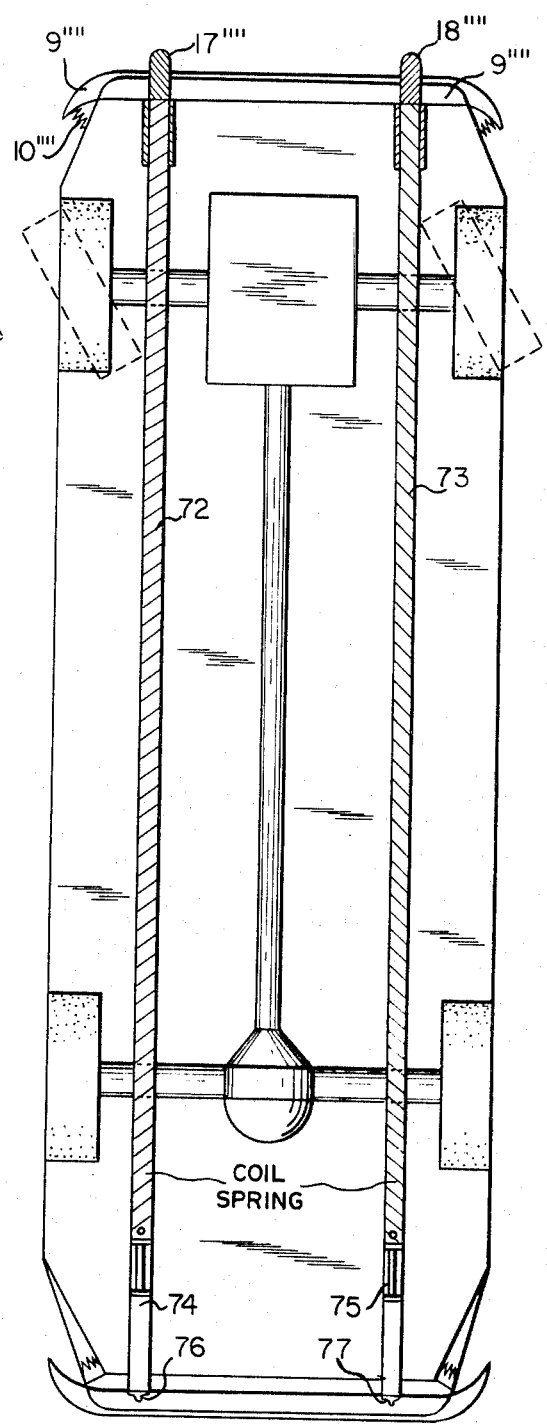
FIG. 7 is a view similar to FIG. 1, but of a further embodiment according to the present invention.

With respect to the embodiment of FIG. 7, the structure is identical to that of the preceeding embodiments with the exception of the following items to be described with respect to the impact energy absorbing means. Upon impact, the impact member 17'''' or 18'''' will be driven rearwardly and carry therewith the coil spring 72 or 73 to in turn drive the shock absorber 74 or 75, respectively. The shock absorbers 74, 75 may be pneumatic or hydraulic and of fairly conventional structure as more fully set forth in FIG. 4, but preferably they are pneumatic and comprise pistons sealing with the inner surface of their respective tubes carrying springs 72, 73 for pressurizing air rearwardly thereof within the tubes to drive the air through bleed orifices 76, 77 leading to the atmosphere. In this manner, the impact energy is absorbed by friction as before between the coil spring driving and rebounding within the appropriate tube and further by fluid friction in the known manner of operation for the shock absorbers.

In all of the above embodiments, the tubes are symmetrical with respect to the longitudinal axis and carried within a common horizontal plane. Further, the tubes are rigidly mounted with respect to the vehicle frame and carry therein coil springs or shock absorbers driven by impact members extending through the vehicle bumpers. In all of the embodiments, the springs will be driven away from the impact and in the case of reverse bent tubes forwardly or with respect to bent tubes to the side. In addition, there will be considerable rebounding effects of the coil springs as the energy is continually dissipated during driving and rebounding or combinations thereof. While the impact members may stand above or below the bumpers, it is most desirable to have these members extend through holes within the bumpers so that they will be aligned with and strike the bumpers of other vehicles upon collision, which is particularly important due to the standardization of bumper height. Further, it is seen that the inertia of the impact members will be quite small in comparison to the inertia of standard relatively massive automotive bumpers so that their response will be immediate and the inertia of the entire impact energy absorbing system will progressively increase as the coils of the springs are successively set in motion.

It is further contemplated that various auxiliary springs may be provided to function primarily to hold the various springs and shock absorber components in their normal positions and to return them to their normal positions after relatively minor impacts. With respect to the embodiment of FIG. 7, such return springs would return the shock absorbers 74 to their original position while air would be sucked back through the bleed orifices 76, 77.

Lubrication and means to prevent rust sufficient to seize the various components will be supplied for the springs and shock absorbers, and it would be particularly desirable to construct the impact members and shock absorber components from synthetic materials having particularly desirable lubricating and anti-corrosive properties.

By way of a specific example, let it be assumed that two vehicles each having a weight of 4,000 pounds strike each other, with at least one of the vehicles employing the features of the present invention. Each impact coil in the vehicle according to the present invention will be assumed to be essentially a continuous flexible, steel mass of 3-inch diameter carried within a corresponding 3-inch internal diameter tube and to have a weight of 24 pounds per foot of length. Thus a coil length of 25 feet, which is the preferred overall longitudinal length of the tubes for all of the embodiments, will weigh 600 pounds. Before impact, each vehicle will be assumed to be traveling at 5 miles per hour in opposite directions so that the relative motion is 10 miles per hour. At initial impact of the otherwise standard vehicle employing the features of the present invention, the velocity of this vehicle will be reduced to 3.7 miles per hour while the single struck coil will be given a velocity of 8.7 miles per hour relative to the subject vehicle. The vehicles continue to move toward each other for another 0.013 seconds at which time the other end of the coil impacts the colliding vehicle at another point on its front vehicle, with respect to the embodiments of FIGS. 2, 3 or at which time the other end of the coil strikes an internal bumper, shock absorber, or terminal member as in embodiments of FIGS. 6, 7, 5. This second impact reduces the velocity of the subject vehicle with respect to FIGS. 1 and 3 to 1.4 miles per hour. At this time the relative closing velocity between the 2 vehicles has been reduced from 10 miles per hour to 6.4 miles per hour. Thus, 46 percent of the initial energy has been removed from the final vehicle impact. The conventional bumper and resilient bumper mounting structure will absorb the remaining impact.

In addition to the drive and reverse rebound of the springs as mentioned above, with respect to all the embodiments, there will be a repetitive action with respect to the fluid shock absorbers. Along their length, these springs will be compressing and expanding, and may simultaneously be doing both at various points. Accordingly, the fluid shock absorbers will be undergoing compression of one of their chambers at some times and expansion of the same chamber at other times, with the cycle repeating itself generally in decreasing amplitudes until the system comes at rest. The shock absorbers of FIG. 3, transfer fluid from one side of the piston to the other, the piston will be moving back and forth within its cylinder and the entire piston cylinder arrangement moving back and forth within its respective tube to dissipate energy through fluid friction and sliding friction until the system comes to rest. With respect to the fluid shock absorber of FIG. 7, the expansible chambers will expell air from the orifices 76, 77, and draw air in through the orifices 76, 77, cyclically as the pistons 74, 75 move back and forth. The cyclic action of the springs will be similar as they rebound, and features of the various embodiments may be interchanged for example in all of the embodiments, short springs may be alternated with shock absorbers. Further, the embodiments of FIGS. 2, 3, 5 and 7 may be provided with inner bumpers for the terminal ends of the springs opposite from the impact ends. The ends of the springs opposite from the impact ends may be provided with pneumatic shock absorbers as in FIG. 7 for those embodiments of FIGS. 2, 3, 5 and 7.

Further variations, modifications and embodiments are contemplated according to the broader aspects of the present invention while at the same time the specific details of construction are of considerable importance according to the narrow aspects of the present invention, all as defined by the spirit and scope of the following claims.

What is claimed is:

1. A collision energy absorbing system for wheeled vehicles, comprising: a relatively rigid vehicle frame having a general symmetry with respect to a longitudinal axis aligned with the driving direction and having opposite longitudinal ends; a plurality of wheels supporting and being rotatably mounted on said vehicle frame for rotation about axes generally perpendicular to said longitudinal axis; a first bumper mounted at one longitudinal axis and a second bumper mounted at the opposite longitudinal end of said vehicle frame and generally transverse to said longitudinal axis; an impact member extending a substantial distance outwardly of at least one of said bumpers and generally parallel to said longitudinal axis; means mounting said impact member for longitudinal movement with respect to said one bumper and said vehicle frame; energy absorbing means drivingly connected to said impact member and movably mounted with respect to said vehicle frame for absorbing a considerable amount of impact energy upon said impact member being struck and driven inwardly toward the outer confines of said one bumper; said energy absorbing means including a tube fixedly mounted with respect to said vehicle frame and carrying therein, in sliding engagement, a coil spring means drivingly connected at one end with said impact member; said tube being longitudinally aligned with said impact member at one end, and extending to the opposite end of said vehicle frame from said one bumper; the opposite end of said tube being bent arcuately, in a horizontal plane, to extend generally at right angles to said longitudinal axis and for guiding said coil spring means under impact away from the impact and arcuately to one side of said vehicle for transferring impact energy and forces from said impact member in a longitudinal direction at one end of the vehicle to the opposite end of the vehicle in a transverse direction.

2. The vehicle of claim 1, wherein said one bumper is resiliently mounted, with respect to the longitudinal axis direction, to said vehicle frame for absorbing impact energy delivered by an object driving said impact member inwardly said substantial distance to thereafter strike said one bumper.

3. The vehicle of claim 1, wherein said energy absorbing means further includes a piston mounted for reciprocation within the opposite end of said tube and in driving engagement with the other end of said coil spring means on one side of said piston, and further including a pneumatic throttle on the terminal opposite end of said tube to form with the other side of said piston a contractible chamber pneumatic shock absorber.

4. The vehicle of claim 1, wherein said coil spring means includes a plurality of axially adjacent coil springs within said tube and a plurality of fluid shock absorbers drivingly mounted between adjacent ends of said coil springs within said tube, and said coil springs and pneumatic shock absorbers being freely mounted, except for friction, within said tube for axial movement.

5. A collision energy absorbing system for wheeled vehicle, comprising: a relatively rigid vehicle frame having a general symmetry with respect to a longitudinal axis aligned with the driving direction and having opposite longitudinal ends; a plurality of wheels supporting and being rotatably mounted on said vehicle frame for rotation about axes generally perpendicular to said longitudinal axis; a first bumper mounted at one longitudinal end of said vehicle frame generally transverse to said longitudinal axis and a second bumper mounted at the opposite longitudinal end of said vehicle frame and generally transverse to said longitudinal axis; an impact member extending a substantial distance outwardly of at least one of said bumpers and generally parallel to said longitudinal axis; means mounting said impact member for longitudinal movement with respect to said one bumper and said vehicle frame; energy absorbing means drivingly connected to said impact member and movably mounted with respect to said vehicle frame for absorbing a considerable amount of impact energy upon said impact member being struck and driven inwardly toward the outer confines of said one bumper; said energy absorbing means including a tube fixedly mounted with respect to said vehicle frame and carrying therein, in sliding engagement, a coil spring means drivingly connected at one end with said impact member; said tube being longitudinally aligned with said impact member at one end, and extending to the opposite end of said vehicle frame from said one bumper; said tube at its opposite end extending in a semicircle contained within a horizontal plane at the other end of the vehicle to continue forward to the one end of said vehicle on the opposite side of said longitudinal axis, and further including a secondary impact member mounted for movement with respect to said frame and one bumper, but longitudinally inside of said bumper and drivingly connected to said impact energy absorbing means so that a blow in the longitudinal direction to said first impact member will be transferred by said impact energy absorbing means to said secondary impact member in the opposite direction to drive said secondary impact member being mounted freely in the longitudinal direction to be driven forward beyond said bumper without striking said bumper.

6. The vehicle of claim 5, including a second assembly of impact member, tube and energy absorbing means being a mirror image of the first mentioned corresponding members with respect to said longitudinal axis and all being in a horizontal plane.

7. The vehicle of claim 1, including a second assembly of an impact member, tube, and coil spring means being a mirror image of said first mentioned corresponding members with respect to said longitudinal axis and all being in a common horizontal plane.

8. The vehicle of claim 1, wherein said bumper includes a longitudinally extending hole therethrough receiving freely therein said impact member.

9. A collision energy absorbing system for wheeled vehicles, comprising: a relatively rigid vehicle frame having a general symmetry with respect to a longitudinal axis aligned with the driving direction and having opposite longitudinal ends; a plurality of wheels supporting and being rotatably mounted on said vehicle frame for rotation about axes generally perpendicular to said longitudinal axis; a tubular member generally extending for the full longitudinal length of said vehicle; energy absorbing means guidingly received within substantially the full length of said tubular member for relative sliding motion; impact receiving means at one end of said vehicle for transferring impact energy directly to said energy absorbing means within said tubular member for driving said energy absorbing means through said tubular member, and being mounted for movement with respect to said vehicle frame; and the opposite end of said tubular member and energy absorbing means being arcuate to extend transversely with respect to said longitudinal axis and redirect the impact energy through the medium of said energy absorbing means in a transverse direction at the opposite end of the vehicle.

10. The device of claim 9, including a second assembly of impact receiving means, tubular member and energy absorbing means being a mirror image of said first mentioned corresponding members, and together being symmetrical with respect to said longitudinal axis and contained in a common horizontal plane.

11. The device of claim 10, wherein said tubular members and energy absorbing means further extend from said arcuate portion at the opposite end of said vehicle again for substantially the entire longitudinal length of said vehicle to transversely adjacent their one end for redirecting impact forces in the opposite longitudinal direction from which they are received; and means for transferring these redirected forces back to the impact object independently of said vehicle frame.

12. The device of claim 9, wherein said energy absorbing means includes coil spring means freely slidable within said tubular member.

13. The device of claim 12, wherein said energy absorbing means further includes expansible chamber fluid shock absorber means drivingly connected with said coil spring means within said tubular member.

14. A collision energy absorbing system for wheeled vehicles, comprising: a relatively rigid vehicle frame having a general symmetry with respect to a longitudinal axis aligned with the driving direction and having opposite longitudinal ends; a plurality of wheels supporting and being rotatably mounted on said vehicle frame for rotation about axes generally perpendicular to said longitudinal axis; a first bumper mounted at one longitudinal end of said vehicle frame generally transverse to said longitudinal axis and a second bumper mounted at the opposite longitudinal end of said vehicle frame and generally transverse to said longitudinal axis; an impact member extending a substantial distance outwardly of at least one of said bumpers and generally parallel to said longitudinal axis; means mounting said impact member for longitudinal movement with respect to said one bumper and said vehicle frame; energy absorbing means drivingly connected to said impact member and movably mounted with respect to said vehicle frame for absorbing a considerable amount of impact energy upon said impact member being struck and driven inwardly toward the outer confines of said one bumper; said energy absorbing means including a tube fixedly mounted with respect to said vehicle frame and carrying therein, in sliding engagement, a coil spring means drivingly connected at one end with said impact member; said tube being longitudinally alinged with said impact member at one end, and extending to the opposite end of said vehicle frame from said one bumper; the opposite end of said tube slidably receiving therein a relatively movable driving member connected to the opposite end of said coil spring means; and further including an internal bumper resiliently mounted with respect to said opposite end of said vehicle frame in alignment with said driving member to be struck by outward movement of said driving member as driven by said coil spring means under impact.

* * * * *